UNITED STATES PATENT OFFICE.

JOHANN BAMMANN, OF ELBERFELD, GERMANY, ASSIGNOR TO THE FARBENFABRIKEN OF ELBERFELD COMPANY, OF NEW YORK.

BLUE TETRAZO DYE AND PROCESS OF MAKING SAME.

SPECIFICATION forming part of Letters Patent No. 606,181, dated June 28, 1898.

Application filed December 20, 1897. Serial No. 662,702. (Specimens.) Patented in France October 30, 1893, No. 233,732; in England October 31, 1893, No. 20,579, and in Italy December 31, 1893, XXVIII, 36,335, LXXI, 208.

*To all whom it may concern:*

Be it known that I, JOHANN BAMMANN, doctor of philosophy, chemist, (assignor to the FARBENFABRIKEN OF ELBERFELD COMPANY, of New York,) residing at Elberfeld, Germany, have invented a new and useful Improvement in Blue Tetrazo Dyes, (for which the Farbenfabriken, vormals Fr. Bayer & Co., of Elberfeld, Germany, has already obtained Letters Patent in England, No. 20,579, dated October 31, 1893; in France, No. 233,732, dated October 30, 1893, and in Italy, Reg. Gen., Vol. XXVIII, No. 36,335, Reg. Att., Vol. LXXI, No. 208, dated December 31, 1893;) and I hereby declare the following to be a clear and exact description of my invention.

My invention relates to the production of new blue tetrazo dyestuffs by combining one molecule of a tetrazolyzer paradiamin, such as benzidin, tolidin, dianisidin, with two molecules of that amidonaphtholdisulfo-acid which is described in the German Letters Patent No. 80,741, dated August 20, 1893, (granted to the Farbenfabriken, vormals Friedrich Bayer & Co., of Elberfeld, Germany,) and which has the formula:

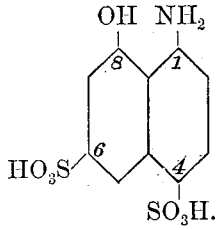

The dyestuffs thus obtained are dark powders soluble in water with from reddish-blue to blue color and dyeing unmordanted cotton from violet-blue to blue shades. All these coloring-matters can be rediazotized either in solution or on the fiber and subsequently coupled with the known dyestuff components. These coloring-matters have the general formula:

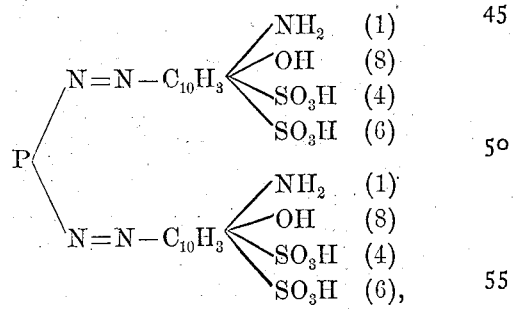

(P meaning in this formula a radical of the benzidin series, such as diphenyl, ditolyl, diphenolether.)

In carrying out my new process practically I can proceed as follows, (the parts being by weight:) 9.2 parts of benzidin are dissolved in forty parts of a nineteen-per-cent. hydrochloric acid, with the addition of a suitable quantity of water, and then diazotized in the usual manner by means of seven parts of sodium nitrite. The resulting tetrazo solution is slowly stirred into an icy-cold solution of thirty-eight parts of 1.8 amidonaphthol, 4.6 disulfonate of sodium in five hundred parts of water, to which solution such a quantity of sodium carbonate is added as is necessary to keep the reaction mixture alkaline during the whole process. After stirring for about twelve hours the mixture is heated to about 50° centigrade. Finally, the dyestuff is precipitated by adding common salt, filtered, pressed, and dried.

Instead of coupling both molecules of the amidonaphtholdisulfo-acid with the tetradiphenyl molecule in an alkaline solution one can at first combine equimolecular proportions of the said compounds in a weak acetic-acid solution, and, secondly, combine the resulting intermediate product with the second molecule of the amidonaphtholdisulfo-acid in an alkaline solution.

The new dyestuff is the sodium salt of an acid having the formula:

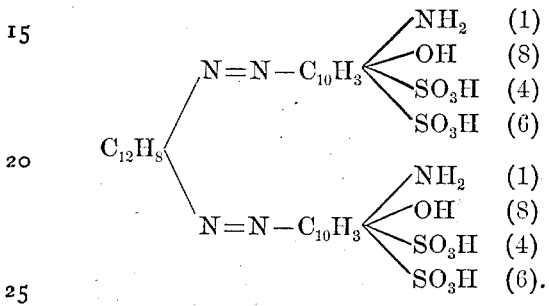

It represents when dry and pulverized a dark powder, with a bronzy luster, easily soluble in water, with a reddish-blue color, in concentrated sulfuric acid (66° Baumé) with a greenish-blue color, which turns into bluish violet on adding a small quantity of ice, while a bluish-violet flaky precipitate is obtained on the addition of a larger quantity of ice to the sulfuric-acid solution.

The coloring-matter dyes unmordanted cotton violet-blue shades which are fast to acids and alkalies.

Having now described my invention and in what manner the same is to be performed, what I claim as new, and desire to secure by Letters Patent, is—

1. The process for producing new tetrazo dyestuffs by combining one molecule of a tetrazotized paradiamin with two molecules of 1.8 amidonaphthol 4.6 disulfo-acid substantially as hereinbefore described.

2. The process for producing a new tetrazo dyestuff by combining one molecule of a tetrazodiphenyl salt with two molecules of 1.8 amidonaphthol 4.6 disulfo-acid substantially as hereinbefore described.

3. As new articles of manufacture the new dyestuffs from tetrazotized paradiamins with two molecules of 1.8 amidonaphthol 4.6 disulfo-acid, being alkaline salts of acids having the general formula:

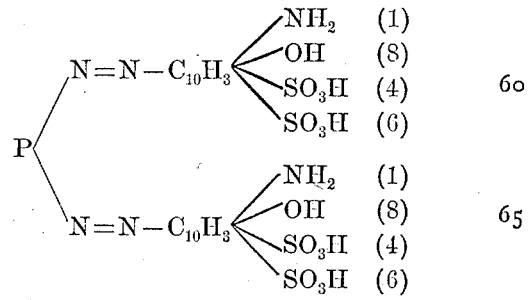

in which formula P means a radical of the benzidin series such as diphenyl, and which are dark powders, soluble in water with from reddish-blue to blue color, yielding on unmordanted cotton from violet-blue to blue shades substantially as described.

4. As a new article of manufacture the specific dyestuff, being an alkaline salt of an acid having the formula:

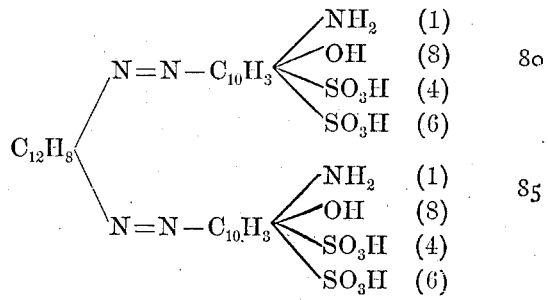

which is in the form of the sodium salt a dark powder with a bronzy luster, easily soluble in water with a reddish-blue color, being dissolved by concentrated sulfuric acid (66° Baumé) with a greenish-blue color which turns into bluish violet on adding a small quantity of ice while a bluish-violet flaky precipitate is obtained on the addition of a larger quantity of ice to the sulfuric-acid solution, dyeing unmordanted cotton violet-blue shades fast to acids and alkalies substantially as described.

In testimony whereof I have signed my name in the presence of two subscribing witnesses.

JOHANN BAMMANN.

Witnesses:
R. E. JAHN,
OTTO KÖNIG.